No. 872,594. PATENTED DEC. 3, 1907.
P. R. WARREN.
BOX FOR CANDY AND OTHER ARTICLES.
APPLICATION FILED JAN. 5, 1905.

WITNESSES
Fred E. Dorr
E. B. Tomlinson

INVENTOR
Peter R. Warren
by Alex. P. Brown
attorney

UNITED STATES PATENT OFFICE.

PETER R. WARREN, OF BROOKLINE, MASSACHUSETTS, ASSIGNOR TO THE P. R. WARREN COMPANY, OF BOSTON, MASSACHUSETTS, A CORPORATION OF MAINE.

BOX FOR CANDY AND OTHER ARTICLES.

No. 872,594.     Specification of Letters Patent.     Patented Dec. 3, 1907.

Application filed January 5, 1905. Serial No. 239,719.

*To all whom it may concern:*

Be it known that I, PETER R. WARREN, a citizen of the United States, residing at Brookline, in the county of Norfolk and State of Massachusetts, have invented certain new and useful Improvements in Boxes for Candy and other Articles, of which the following is a specification.

My invention relates to an improvement in boxes for containing candy and other articles, in which the box is provided at its top or cover with a "sight-aperture" through which the contents of the box may be viewed, and my invention consists in the combination with a box of this type, of a supplemental inner cover, preferably provided with depending flanges adapted to extend down against the inner faces of the ends or sides of the box, and also provided with a sight-aperture registering with that in the box-top or outer cover, and covered with transparent material, whereby the contents of the box are additionally protected and the air more effectually excluded therefrom.

Figure 1:
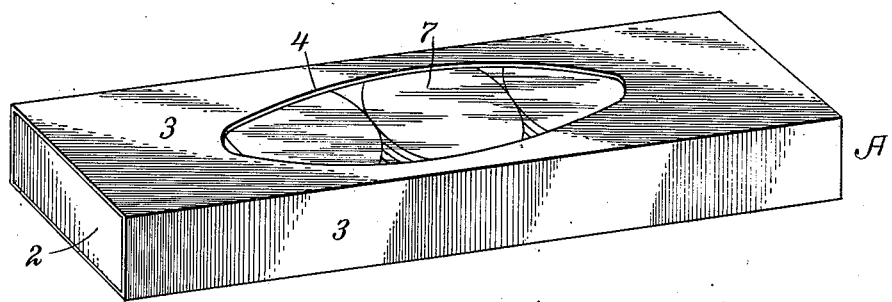
Figure 2:
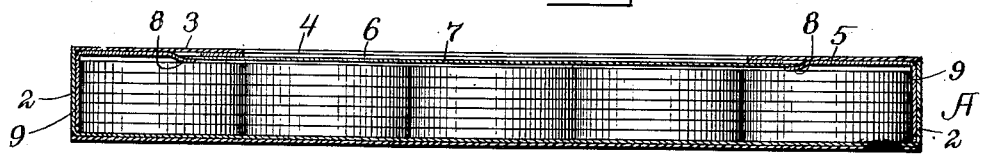
Figure 3:
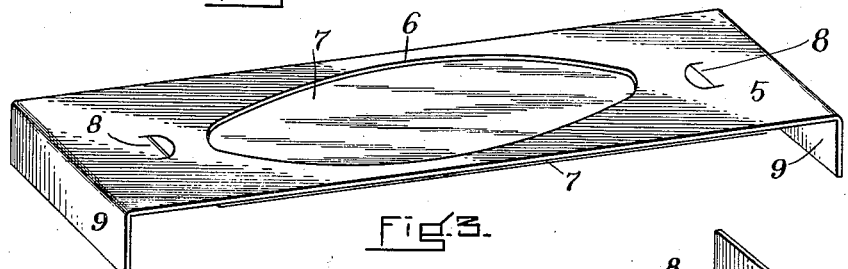
Figure 4:
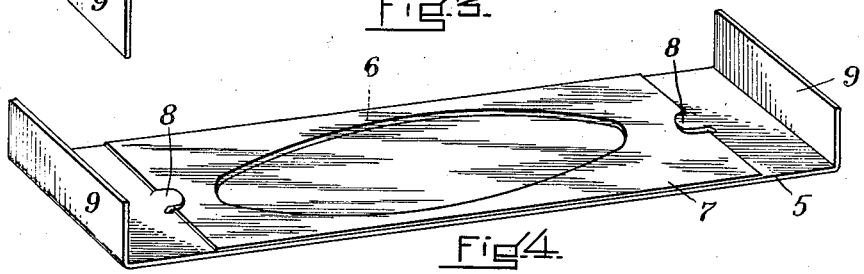

In the accompanying drawings:—Figure 1 is a perspective view of a box adapted for containing candy or other articles and provided with my improvement. Fig. 2 is a longitudinal vertical section of the same. Fig. 3 is a view of the supplemental inner cover. Fig. 4 is a view of the under side of the same, showing one method of securing thereto the transparent material which covers its sight-opening.

Referring to the drawings, A represents a box which may be composed of a body or inner portion 2 adapted to slide endwise within an outer cover or casing 3, open at both ends as shown. This cover 3 is provided in its top with a "sight-aperture" 4, through which the contents of the box can be seen.

Within the body-portion of the box is placed a supplemental inner cover 5 consisting of a strip of cardboard or other suitable material adapted to fit snugly therein, and having an aperture 6 registering with the sight-aperture 4 of the outer casing or cover 3, said aperture 6 being covered with a piece of transparent material 7 which is secured upon the underside of the strip, preferably by means of tabs or slits 8 formed by cutting through said strip, a simple, cheap, and effective method of securing the transparent material to the inner cover without the use of glue or other adhesive substance being thus provided. The opposite ends of the strip 5 are preferably bent downward forming depending flanges 9, which extend down between the contents of the box and its ends or sides, whereby it is held securely in place. The supplemental air-excluding cover, and the arrangement of sight-apertures, serve to attractively display the contents of the box and at the same time as an additional protector for the goods and also to more effectually exclude the air than where only the usual cover is employed, such exclusion of the air being an important feature in connection with many kinds of confectionery and other edible articles.

By applying the transparent material to the under side of the supplemental inner cover and securing it thereto by means of tabs or slits as described, the upper surface of the said inner cover is left smooth, so that no obstruction is offered to the free sliding of the body-portion of the box within the outer casing.

What I claim as my invention and desire to secure by Letters Patent is:—

1. In combination with a box tray having an open top, an outside cover independent of the tray and having a sight-opening in the top, an independent inside removable cover for the contents of the box consisting of a sheet of stiff material such as card board or the like having a flat top portion which is adapted to fit the interior of the tray and has downwardly extending end flanges which are adapted to fit inside the end walls of the tray, a sight-opening in said inner cover which registers with the sight-opening in the outer cover and a sheet of transparent material lying wholly on the under side of said cover and closing said opening and secured to the under surface of said cover.

2. In combination with a box tray having an open top, an outside cover independent of the tray and having a sight-opening in the top, an independent inside removable cover for the contents of the box consisting of a sheet of stiff material such as card board or the like having a flat top portion which is adapted to fit the interior of the tray and has downwardly extending end flanges which are adapted to fit inside the end walls of the tray, a sight-opening in said inner cover which registers with the sight-opening in the outer cover and a sheet of transparent material lying wholly on the under side of said inner cover and closing said opening and secured to the under surface of said inner cover by downward clips formed by slitting said inner cover whereby the outer surface of said
5 inner cover and the inner surface of said outer cover being adjacent to each other are free from interfering projections.

In testimony whereof I have hereunto subscribed my name this 31st day of December, 1904.

PETER R. WARREN.

Witnesses:
 ALEX. P. BROWNE,
 ELLEN B. TOMLINSON.